United States Patent

[11] 3,609,558

[72] Inventors Yukihiko Ise;
Yuichi Kaname, both of Osaka, Japan
[21] Appl. No. 835,342
[22] Filed June 23, 1969
[45] Patented Sept. 28, 1971
[73] Assignee Matsushita Electric Industrial Co., Ltd. Osaka, Japan
[32] Priority June 26, 1968
[33] Japan
[31] 43/45343

[54] SWITCHING DEVICE EMPLOYING A PIEZOELECTRIC CERAMIC RESONATOR
6 Claims, 8 Drawing Figs.

[52] U.S. Cl. .......... 325/487, 179/15 BT, 329/117
[51] Int. Cl. .......... H04b 1/16, H03k 3/00
[50] Field of Search .......... 343/205; 325/487; 179/15 BT; 329/117, 198; 331/73; 310/8.1

[56] References Cited
UNITED STATES PATENTS 3,294,915 12/1966 Wetherby et al. .......... 179/15 BT
3,522,382 7/1970 Ise .......... 179/15 BT

*Primary Examiner*—Robert L. Griffin
*Assistant Examiner*—James A. Brodsky
*Attorney*—Wenderoth, Lind and Ponack

ABSTRACT: A switching device has a piezoelectric ceramic resonator having a grounded terminal, an input terminal which is supplied with a subcarrier signal to give said piezoelectric ceramic resonator a piezoelectric vibration, and two output terminals, one of which derives a first electrical signal induced from said vibration, and the other of which derives a second electrical signal which opposite in phase to said first signal. A resistor circuit has a midpoint terminal which is supplied with a composite signal including a mixture of two distinct supressed-carrier modulated signals, and two end terminals, connected across the resonator output terminals at each of which is produced a balanced signal of said composite signal. A detector has two input terminals connected to the resistor circuit end terminals one of which receives the partially demodulated first signal which is a mixture of said balanced signals and said first signal, and another of which receives the partially demodulated second signal which is a mixture of said balanced signals and said second signal, two output terminals, at one of which is produced a single distinct signal detected from said partially demodulated first signal and at the other of which is produced a single distinct signal detected from said partially demodulated second signal. Said piezoelectric ceramic resonator is a thin rectangular plate and has a resonance vibration at the frequency of said subcarrier signal.

INVENTORS
YUKIHIKO ISE
YUICHI KANAME

BY *Wenderoth, Lind & Ponack*
ATTORNEYS

INVENTORS
YUKIHIKO ISE
YUICHI KANAME

BY Wenderoth, Lind & Ponack
ATTORNEYS

INVENTORS
YUKIHIKO ISE
YUICHI KANAME

BY Wenderoth, Lind & Ponack
ATTORNEYS

INVENTORS
YUKIHIKO ISE
YUICHI KANAME

BY Wenderoth, Lind & Ponack
ATTORNEYS

SWITCHING DEVICE EMPLOYING A PIEZOELECTRIC CERAMIC RESONATOR

BACKGROUND OF THE INVENTION

1. Field of the Invention

This invention relates to a switching device comprising a piezoelectric ceramic resonator, a resistor circuit and a detector coupled with said resonator, said switching device being capable of demodulating a composite signal including a mixture of two distinct suppressed carrier modulated signals and transmitting separately each of the distinct signals.

2. Description of the Prior Art

A conventional switching device for demodulating a transmitted suppressed carrier modulated signal consists of a switching transformer having coils and capacitors.

However, the coils known in the prior art have usually been inferior in the tolerances and the stability with respect to temperature and load life test. Therefore, precise adjustment of the coils has been required to reproduce the modulated signal with high fidelity.

A piezoelectric ceramic resonator has been widely used for an electric wave filter or a frequency selective transformer, and has a high stability with respect to temperature and time.

In copending application Ser. No. 719,364 filed on Apr. 8, 1968, now U.S. Pat. No. 3,294,915 there is disclosed a switching device comprising a piezoelectric ceramic resonator having six terminals and a switching bridge circuit for a switching device, especially as a switching device for an FM stereo multiplex demodulator. This device, however, has one or more various disadvantages including the fact that it is difficult to fabricate that it has a narrow band width for a transmitted signal, it causes ordinary channel separation because of a large coupling capacitance between electrodes, and the connection of the terminals is complicated.

The present invention seeks to provide an improved switching device which overcomes one or more of the disadvantages.

SUMMARY OF THE INVENTION

An object of the present invention is to provide a switching device which is used in demodulation of a suppressed carrier multiplex transmitted signal for electrical communication and which is characterized by superior channel separation.

A further object of the present invention is to provide a switching device for channel separation which is characterized by high stability with respect to temperature and time.

A further object of the present invention is to provide a switching device characterized by ease of construction.

A further object of the present invention is to provide a switching device characterized by superiority in separating FM stereophonic composite signals and by improved frequency response in the low audio frequency range.

The objects are achieved by providing a switching device according to the present invention which comprises a piezoelectric ceramic resonator having a grounded terminal, an input terminal which is supplied with a subcarrier signal to give said piezoelectric ceramic resonator a piezoelectric vibration, and two output terminals, one of which derives a first electrical signal induced from said vibration, and the other of which derives a second electrical signal which has a phase opposite that of said first signal. A resistor circuit having a midpoint terminal which is supplied with a composite signal including a mixture of two distinct suppressed-carrier modulated signals, and two end terminals, at each of which is produced a balanced signal of said composite signal, respectively, has the end terminals connected to the output terminals of said piezoelectric resonator. A detector has two input terminals connected to the piezoelectric resonator output terminals, one of which receives the partially demodulated first signal which is a mixture of said balanced signal and said first signal, and the other of which receives the partially demodulated second signal which is a mixture of said balanced signal and said second signal. The detector has two output terminals, at one of which is produced a single distinct signal detected from said partially demodulated first signal and at the other of which is produced a single distinct signal detected from said partially demodulated second signal. Said piezoelectric ceramic resonator is a thin rectangular plate and is resonant at the frequency of said subcarrier signal.

BRIEF DESCRIPTION OF THE DRAWINGS

Other features of the present invention will become apparent upon consideration of the following detailed description taken together with the accompanying drawings wherein.

DESCRIPTION OF A PREFERRED EMBODIMENT

Before proceeding with the detailed description of the novel switching device of the present invention, a demodulation mechanism for a modulated signal modulated by suppressed-carrier modulation, such as a stereophonic composite signal for FM stereophonic multiplex broadcasting, will be explained with reference to FIG. 1.

Figure 1:
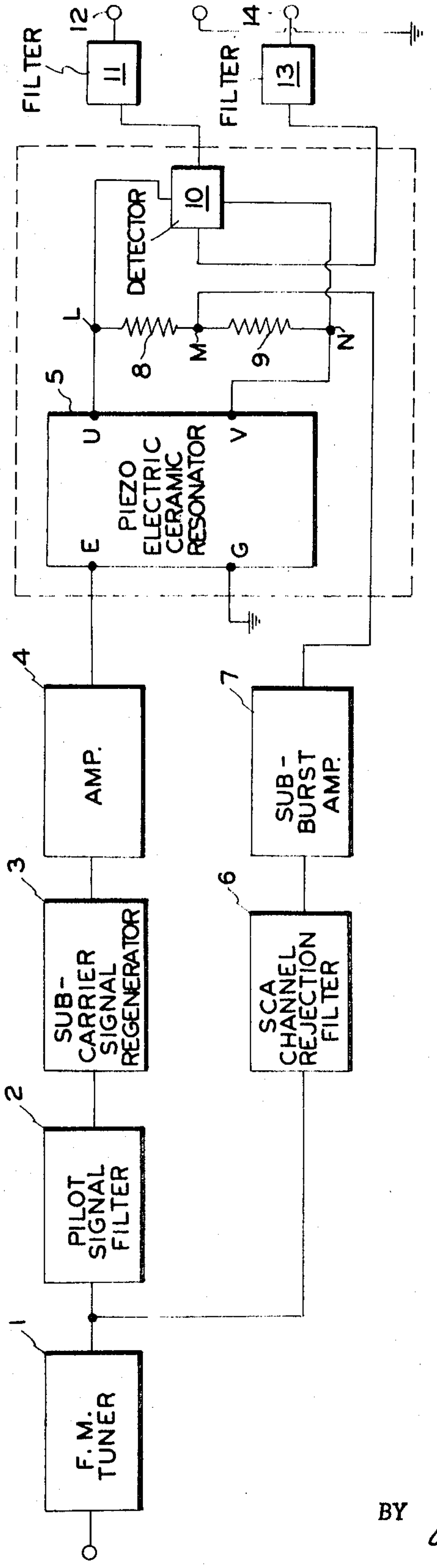
FIG. 1 is a block diagram of an FM stereo multiplex demodulator circuit using the switching device of the present invention.

Referring to FIG. 1, an FM tuner 1 derives a desired stereophonic composite signal including a mixture of two distinct signals in accordance with the following equation (1):

$$A=(L+R)+(L-R)\cos wt+p\cos w/2t+S \quad (1)$$

in which, $A$ is the amplitude of the stereophonic composite signal, $L$ is the amplitude of the single distinct signal from the left-hand channel $R$ is the amplitude of the single distinct signal from the right-hand channel, $w$ is the angular frequency of the subcarrier, and $p$ is the amplitude of the pilot signal. $S$ is the amplitude of the subsidiary communications authorization (abbreviated to SCA) channel signal, $(L+R)$ represents the main channel signal and $(L+R)$ coswt represents the subchannel signal. In the modulated signal for FM stereo multiplex broadcasting, the subchannel signal is modulated by suppressed-carrier modulation.

The desired stereophonic composite signal from the FM tuner 1 enters two branch circuits, as shown in FIG. 1, and is separated into a pilot signal and other signals. The pilot signal of the stereophonic composite signal enters a pilot signal filter and is converted into a subcarrier signal by subcarrier signal regenerator 3. An amplifier 4 connected to said subcarrier regenerator 3 amplifies said subcarrier signal. The amplified subcarrier signal enters an input terminal E of a piezoelectric ceramic resonator 5 having a grounded terminal G. The other signals of said stereophonic composite signal enter an SCA channel rejection filter 6 which filters out the SCA signal. The modified composite signal is arranged by a subburst amplifier 7 to hold a desired relation between the main channel and subchannel signals. Said amplifier 7 is connected with midpoint terminal M of two resistors 8 and 9 connected in series. Said piezoelectric ceramic resonator 5 has a resonant frequency equal to the frequency of said subcarrier signal. Said piezoelectric ceramic resonator 5 is vibrated by said subcarrier signal in a resonance vibration mode.

At a output terminal U of said resonator 5 there is obtained a first electric signal induced by the vibration of said piezoelectric ceramic resonator 5. Said terminal U is connected with an input terminal of a detector 10 through an end terminal L of the resistor circuit at which appears half of said arranged composite signal passed through said resistor 8 from said midpoint terminal M.

Said first signal is a pure sinusoidal waveform signal of the frequency of said subcarrier signal and has a large amplitude which is capable of actuating a switching circuit of said detector 10. At an output terminal V there is obtained a second electric signal induced by said vibration. Said terminal V is connected with the other input terminal of said detector 10 through a second end terminal N of the resistor circuit at which appears the other half of said arranged composite signal passed through said resistor 9 from said midpoint terminal M.

Said second signal is a pure sinusoidal signal and has a large amplitude which is equal to the amplitude of said first signal.

Said second signal, however, is opposite in phase to said first signal.

Said first signal and the half of said arranged composite signal are mixed at said terminal L and enter the input terminal of said detector 10. Said mixed signal is the partially demodulated first signal which is approximately expressed by the equation (2):

$$A_1=(L+R)+\pi/2(L-R)\ \mathrm{coswt}+Vc\ \mathrm{coswt} \qquad (2)$$

$$Vc>>L \text{ and } R, \qquad (3)$$

in which, $A_1$ is the amplitude of said partially demodulated first signal and $Vc$ is the amplitude of the subcarrier signal derived by said piezoelectric resonator 5. The arranged subchannel signal $\pi/2(L-R)$ coswt can be demodulated by insertion of said subcarrier. The other input terminal of said detector 10 is supplied with the partially demodulated second signal which is a mixture of said second signal and the other half of said arranged composite signal at said terminal N. Said partially demodulated signal is approximately expressed by he equation (4):

$$A_2=(L+R)+\pi/2(L-R)\ \mathrm{coswt}-Vc\ \mathrm{coswt} \qquad (4)$$

$$Vc>>L \text{ and } R$$

in which $A_2$ is the amplitude of said partially demodulated second signal.

Said partially demodulated first signal is modified, by said detector 10, which is a switching bridge circuit type detector into a single distinct signal $A_1'$ which is approximately represented as 2L, and which is fed to an output terminal 12 through a filter 11 which removes unwanted signals. Said partially demodulated second signal is modified by said detector 10 into a single distinct signal $A_2'$ which is approximately represented as 2R, and which is fed to an output terminal 14 through a filter 13 which removes unwanted signals.

It is important that said piezoelectric ceramic resonator be a thin rectangular plate, and have its resonance frequency at the frequency of said subcarrier, so as to couple with said two series resistors having a midpoint terminal for feeding said composite signal.

Figure 2:
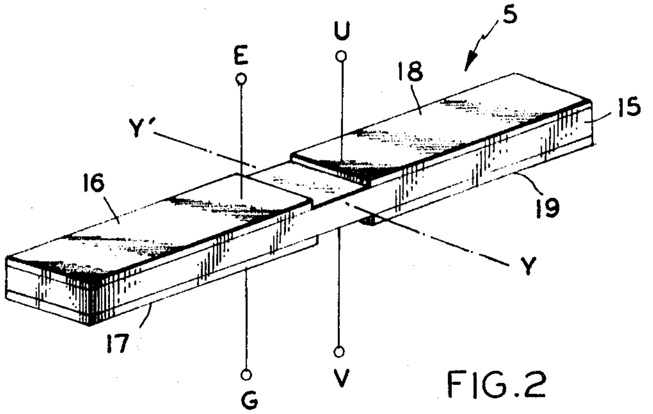
FIG. 2 is a perspective view of a four terminal piezoelectric ceramic resonator of one type utilized in the present invention.

Referring to FIG. 2, reference character 5 designates, as a whole, a piezoelectric ceramic resonator 5 which comprises a piezoelectric ceramic body 15 in the form of a rectangular thin plate. Two pairs of opposed electrodes 16 and 17, and 18 and 19 are applied to the large faces of said ceramic body 15 and are made substantially symmetrical with respect to the transverse center axis Y—Y′ of said body 15. Said two pairs of electrodes 16 and 17, and 18 and 19, are extended along the longitudinal axis of said body 15 from both ends of said body to approximately the middle, and are extended approximately over the full width of said body 15, and have terminals E and G, and U and V attached thereto, respectively.

The piezoelectric ceramic body 15 is polarized in the direction of its thickness. When an electrical input voltage is supplied between one pair of the two pairs of terminals, for example between terminals E and G of the resonator 5, there appears at each of the other pair of terminal U and V an electrical signal induced by the resonator 5. The electric signal from said pair of terminals U–V becomes a maximum at the resonant frequency of the length extensional vibration mode.

Figure 3:
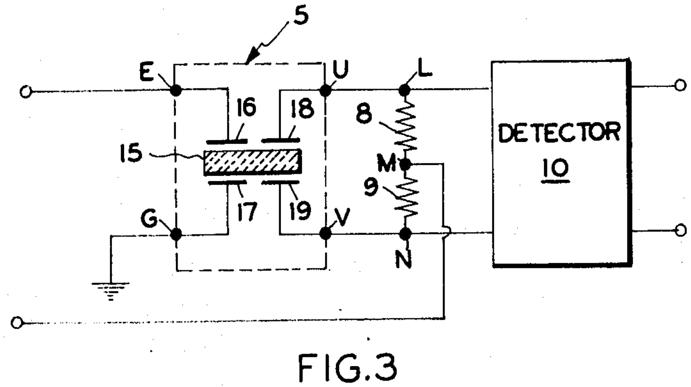
FIG. 3 is a diagram showing the electrical connections between terminals of the resonator shown in FIG. 2.

Referring to FIG. 3, wherein similar reference characters designate elements similar to those of FIG. 2, a piezoelectric ceramic resonator 5 has two pairs of terminals E–G and U–V joined together with two pairs of electrodes 16–17, and 18–19, respectively.

The terminals of a pair of terminals E–G act as an input terminal for a subcarrier signal and a grounded terminal, respectively.

The terminals other pair of terminals U–V act as a first output terminal and a second output terminal, respectively.

Figure 4:
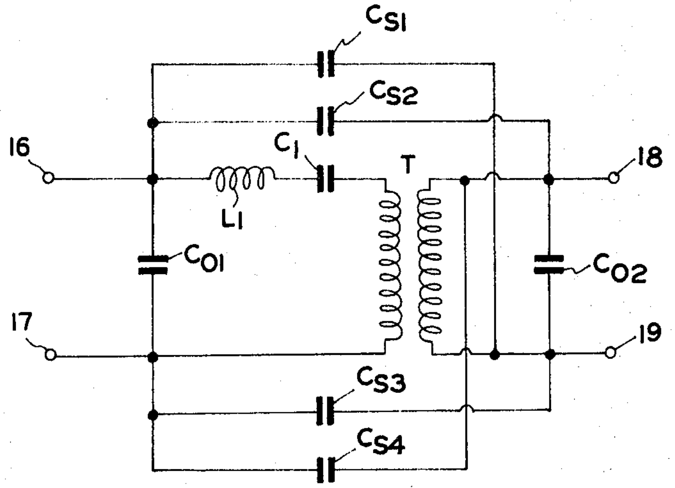
FIG. 4 is a representation of an equivalent circuit of the resonator shown in FIG. 2.

The equivalent circuit of a piezoelectric ceramic resonator having two pair of terminals as shown in FIG. 2 can be represented as shown in FIG. 4.

Referring to FIG. 4, the equivalent circuit consists essentially of shunting capacitances $C_{01}$ and $C_2$, series resonance arm $L_1$ and $C_1$, transformer T, and coupling capacitances $C_{s1}$, $C_{s2}$, $C_{s3}$, and $C_{s4}$. The capacitances $C_{01}$ and $c_{02}$ are shunting capacitances connected between said electrodes 16–17, and 18–19, respectively. The inductance $L_1$ is an equivalent motional inductance corresponding to mechanical mass. The capacitance $C_1$ is an equivalent motional capacitance corresponding to mechanical compliance. The transformer T is an idealized transformer having a 1:1 impedance transformation ratio and being positive or negative in polarity. The polarity of said transformer T represents a phase relation between an input signal at the terminal E and an output signal at the terminal U. When the polarity is positive, said input and output signals are in the same phase.

The capacitance $C_{s1}$ is a coupling capacitance between electrodes 16 and 19. The capacitance $C_{s2}$ is a coupling capacitance between electrodes 16 and 18. The capacitances $C_{s3}$ and $C_{s4}$ are coupling capacitances between electrodes and 17 and 19, 17 and 18, respectively.

The capacitance ratio $C_1/C_{01}$ or $C_1/C_{02}$ may be expressed by the following equation:

$$\frac{C_1}{C_{01}}=\frac{C_1}{C_{02}}\cong 2\left(\frac{fa^2-fr^2}{fr^2}\right) \qquad (5)$$

where fr is the resonant frequency of said resonator and fa is the antiresonant frequency of said resonator. It has been found that the piezoelectric ceramic resonator 5 achieves optimum performance as a switching device in accordance with the present invention, when it satisfies the following relations;

$$e_u=e_v \qquad (6)$$

and $$(\theta_u-\theta_v)=180^\circ \qquad (7)$$

where $e_u$ is the amplitude of said first signal at the terminal U; $e_v$ is the amplitude of said second signal at the terminal V: $\theta_u$ and $\theta_v$ are the phase angle of said first and second signals with respect to said input signal at the terminal E, respectively.

The term $(\theta_u-\theta_v)$ represents a difference in phase angle between said first signal and said second signal, to achieve the desired relationship between the first signal and the second signal, said coupling capacitances $C_{s1}$, $C_{s2}$, $C_{s3}$ and $C_{s4}$ are arranged to be extremely smaller than the capacitances $C_{01}$, $C_{02}$ and $C_1$ or to be in the following relations.

$$\frac{C_1}{C_{01}}=\frac{C_1}{C_{02}}>>\frac{C_{s1}}{C_{01}},\ \ldots\ ,\frac{C_{s}4}{C_{01}} \qquad (8)$$

By using the equation (5) one may change as follows:

$$C_{s1},\ C_{s2}\ \ldots\ <<C_{01}\left(\frac{fa^2-fr^2}{fr^2}\right) \qquad (9)$$

When, the electrodes 16–18, or 17–19 on the respective large surfaces of said body 15, are spaced by a distance two times to 10 times the thickness of said body 15, the aforesaid difference angle, $(\theta_u-\theta_v)$ has been found experimentally to be in a range of 178°to 179.5°, or 180.5°to 182°. The characteristics are illustrated by the curves of FIG. 5.

Figure 5:
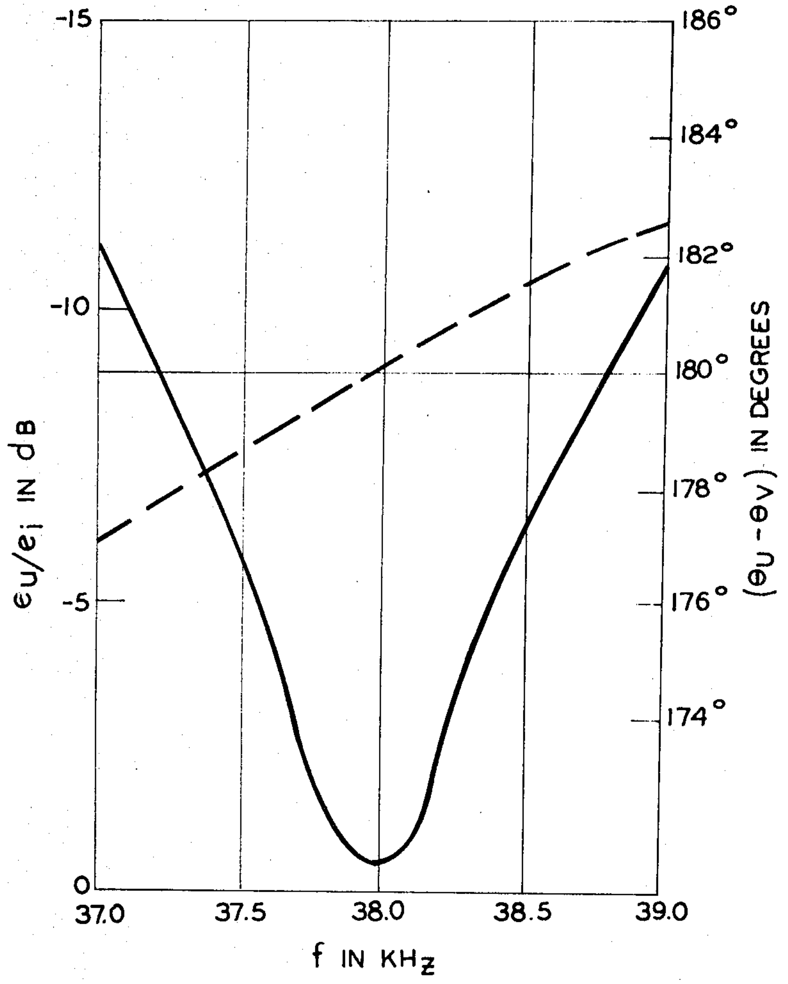
FIG. 5 is a graph of the transmission characteristics of the resonator shown in FIG. 2.

Referring to FIG. 5, the vertical axis of the left side shows the ratio $e_u/e_v$ in db. the vertical axis of the right side shows the difference angle $(\theta_u-\theta_v)$ in degrees and the horizontal axis shows frequency.

The solid curve of FIG. 5 shows the frequency response of $e_u/e_i$, and is characterized by a symmetrical response respect to the axis of the resonant frequency of said resonator 5. The dotted curve shows the frequency response of the difference angle $(e_u-e_v)$ and characteristically passes the vicinity of the 180° point at the the resonant frequency of said resonator 5. It is important that the electrodes 16–18 and 17–19 on the respective large surfaces of said body 15, be spaced by a distance two times to ten times the thickness of said body 5. Referring again to FIG. 1, an explanation will be given of an arrangement of said two resistors 8 and 9 which are in series and coupled with the terminals U and V of said resonator 5.

Referring again to FIG. 1, an explanation will be given of an arrangement of said two resistors 8 and 9 which are in series and coupled with the terminals U and V of said resonator 5.

The signals L and R of said stereophonic composite signal are each an audio signal which is usually in a range of frequency of 0.05 kHz. to 15 kHz., respectively. Thus, the arranged composite signal at said midpoint terminal M of said resistors circuit is a broad band frequency signal including a mixture of two distinct audio signals.

To achieve a desired demodulation of said suppressed carrier subchannel signal at said two end terminals L and N, it is very important that said first signal and said balanced signal of the terminal L be in exactly the same phase over the frequency range of the L or R signals. Said second signal and said balanced signal of the terminal L are exactly opposite phase over the frequency range of the audiofrequency. It has been discovered according to the invention that the shunting circuit according to the invention achieves a superior performance as a switching device when said circuit consists of two identical resistors connected in series.

Figure 6:
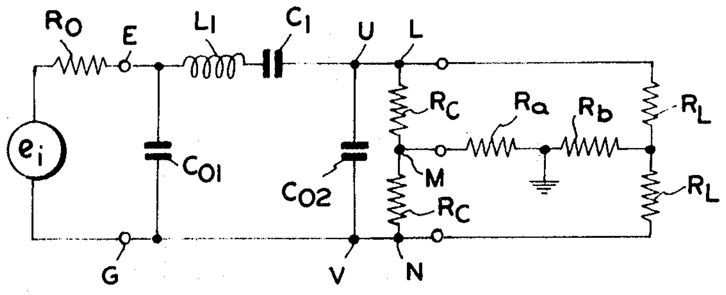
FIG. 6 is a representation of an equivalent circuit for the subcarrier signal of said resonator combined with a resistor circuit and a detector shown in FIG. 1.

An operational equivalent circuit of the piezoelectric ceramic resonator 5 combined with said resistor circuit and an input impedance of the detector 10 as a switching device according to the invention, may be represented as shown in FIG. 6.

Referring to FIG. 6, reference character *ei* is said subcarrier signal: Ro is internal impedance of the source of said subcarrier signal: Rc is said resistor 8 or 9: Ra is an internal impedance of a source of said composite signal at the terminal M: $R_L$ is an equivalent input impedance of the detector 10: $R_b$ is an equivalent output impedance at the output terminal 12 or 14 in FIG. 1.

The following relation for the subcarrier frequency usually holds $$1/\omega_r C_{02},\ R_L \text{ and } R_c >> Ra \text{ and } Rb \qquad (10)$$

To achieve the optimum transmission of the subcarrier signal in such a case, it has been found to be important that the impedances of said equivalent circuit be in the following relationship:

$$\frac{1}{\omega_r C_{02}}=\frac{2}{\frac{1}{Rc}+\frac{1}{R_L}} \qquad (11)$$

where, $\omega_r$ is equal to 2 fr.

As a result, Rc has a value which is equal to the following:

$$Rc=\frac{1}{2\omega_r C_{02}-\frac{1}{R_L}} \qquad (12)$$

if $$R_L>>\frac{1}{2\omega_r C_{02}}$$

$$R_c\cong\frac{1}{2\omega_r C_{02}} \qquad (13)$$

It is important that the total resistance of said resistor circuit coupled with the output terminals U and V of the resonator 5, has a value which is equal to the matching impedance of the output terminals U and V at the resonant frequency of said resonator 5.

Further, it has been discovered according to the invention that the resistance of said two resistors must not vary more than 5 percent.

An operable circuit arrangement for said detector 10 is a switching circuit including diode detectors, such as a switching bridge circuit comprising four branches, two input terminals and two output terminals, each of said branches consisting of a diode and a resistor connected in series.

It is possible to employ any switching circuit capable of changing the aforesaid partially demodulated first and second signals into single distinct signals.

Said detector 10 is combined with the piezoelectric resonator 5 having an input terminal E, first and second output terminal U and V, and a grounded terminal G, and with a resistor circuit having end terminals L and N, and a midpoint terminal M.

Figure 7:
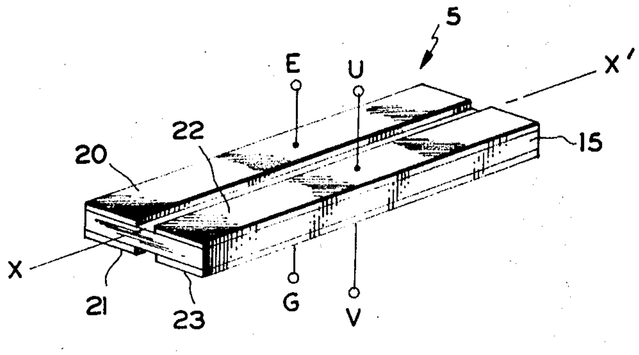
FIG. 7 is a perspective view of a four terminal piezoelectric ceramic resonator of another type which can be utilized in the present invention.

Referring to FIG. 7, reference character 5 designates, as a whole, a piezoelectric ceramic resonator comprising a piezoelectric ceramic body 15 in the form of a rectangular thin plate. Two pairs of opposed electrodes, 20 and 21, and 22 and 23 are applied to the large surfaces of said ceramic body 15 attending in a direction parallel with the longitudinal axis x—x′ of said body 15. Said two pairs of electrodes 20 and 21, and 22 and 23 are positioned substantially symmetrically with respect to the longitudinal center axis X—X′ of said body 15 and have terminals E and G, and U and V attached thereto, respectively. Said ceramic body 15 is polarized in the direction of its thickness. The terminals of one of two pairs of terminals E-G act as an input terminal for said subcarrier signal and a grounded terminal, respectively. The terminals of the other pair of terminals U—V act as a first output terminal and a second output terminal, respectively. When an electrical input voltage is supplied across terminals E and G of the resonator 5, there is produced at each of the other pair of terminals U and V an electrical signal induced by the resonator 5. The electric signal from said pair of terminals U-V becomes maximum at the resonant frequency of the length extentional vibration mode.

The equivalent circuit of the resonator shown in FIG. 7 is similar to the equivalent circuit the resonator shown in FIG. 2. In this case, the polarity of the transformer T is opposite to the transformer of the equivalent circuit of the resonator shown in FIG. 2.

It has been found that use of the piezoelectric ceramic resonator of FIG. 7 produced optimum performance of the switching device according to the invention. When the electrodes on the respective large surfaces of said body 15, i.e. electrodes 20–22 and 21–23 are spaced a distance so as to satisfy the following relations:

$$C_{st}<<C_0(fa^2-fr^2/fr^2 \qquad (5)$$

and $$C_{st}=K/D \qquad (14)$$

where $C_{st}$ represents $C_{s1}$, $C_{s2}$, . . . . . . $C_{s4}$; $D$ is the distance between the electrodes 20 and 22 or 21 and 23; $k$ is a numerical factor depending on said ceramic body 15. The angle $(\theta_u-\theta_v)$ between said first and second signals for the resonator as shown in FIG. 7, is in the range from 175° to 178°, or 182° to 185°. The piezoelectric ceramic resonator of FIG. 7 is also fundamentally resonant in the flexural vibration mode at the subcarrier frequency, and is useful in the switching device according to the invention.

It has been found to be important that the dimension of such a resonator which is resonant in the flexural vibration mode be smaller in size than when it is resonator in the length extensional vibration mode (the dimensions will be explained with respect to experimental data.

Figure 8:
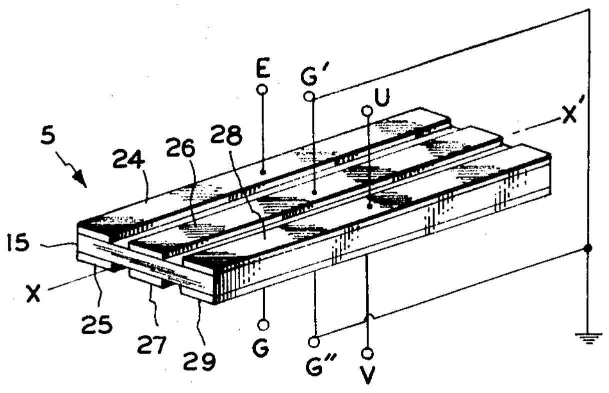
FIG. 8 is a perspective view showing a six terminal resistor which can be utilized in the present invention.

Referring to FIG. 8, reference character 5 designates, as a whole, a piezoelectric ceramic resonator comprising a piezoelectric ceramic body 15 in the form of a rectangular thin plate.

Three pairs of opposed electrodes 24–25, 26–27, and 28–29 are applied to the large surfaces of said ceramic body 15 in parallel with the longitudinal center axis x—x thereof and are substantially symmetrically positioned with respect to the longitudinal center axis X—X′ of said body 15. Said three pairs of electrodes 24–25, 26–27, and 28–29 have terminals, E–G, G′–G″ and U and V attached thereto, respectively. The center pair of terminals G′–G″ are connected to each other and are grounded. The terminals of one of the remaining two pairs of terminals, the terminals for example, E–G, act as an input terminal for a subcarrier signal and a grounded terminal, respectively. The terminals of the last pair of terminals U-V act as a first output terminal and a second output terminal, respectively.

The coupling capacitances $C_{s1}$, $C_{s2}$, $C_{s3}$, $C_{s4}$ of said resonator are negligibly small, because the center pair of opposed electrodes act as electrostatic shield electrodes. As a result, the angle $(\theta_u - \theta_v)$ between the first and second signals range from 179.5° to 180° or 180° to 180.5° that is, $\theta_u$ and $\theta_v$ are almost exactly opposite in phase to each other.

Thus a piezoelectric ceramic resonator which is resonant in either the flexural or length extensional vibrations modes can be used in the switching device according to the invention.

The piezoelectric ceramic resonator used in the present invention is made of a piezoelectric ceramic material, for example, the piezoelectric ceramic material described in the U.S. Pat. No. 3,268,453 in the form of a thin rectangular plate having dimensions as follows;

47.7×6.0×0.7 mm. for resonancy in the length extensional vibration mode 17.0×3.4×0.8 mm. for resonancy in the flexural vibration mode said piezoelectric ceramic material has the piezoelectric characteristics as listed in Table 1.

TABLE 1

| Vibration Mode | Length Extension | Flexural |
|---|---|---|
| frequency constant | 1,800 kHz.-mm. | 650 kHz.-mm. |
| frequency stability | | |
| 0.05%/decode | | 0.07%/decode |
| with time | | |
| with temperature | 37×10[16]/°C. | 50P101[6]/°C. |
| dielectric constant | 1,350 | 1,350 |
| capacitance ratio ($2C_{01}$/ $C_1$) | 55 | 60 |
| mechanical Q | 500 | 500 |

In a specific embodiment of the invention, such a piezoelectric ceramic resonator having two pairs of terminals attached to two pairs of electrodes as shown FIG. 2, and which is combined with shunting resistors as shown in FIG. 1 and a detector, such as switching bridge circuit having the following components;

resistor 8 1.1 *k*ω
resistor 9 1.1 *k***
diode in detector 10 0A79
equivalent load impedance $R_L$ 47 *k*ω the switching device comprising said resonator, said shunting resistors and said detector has a channel separation performance of more than 35–40 db. at a frequency of from 100 Hz. to 10 kHz. Said channel separation performance is characterized by a high stability as indicated by table 2.

TABLE 2

| | variation in channel separation |
|---|---|
| Time | 0.1% decade |
| Temperature | 0.05%/°C. |
| Humidity | 0.2% at 90% RH 80° C. for 500 Hv. |

In foregoing, the disclosed embodiments and specific example of the present invention are set forth as an example of the many modifications which are possible. It is to be understood that the invention provides a switching device for use in the demodulation of modified suppressed carrier signals in an electrical communication system.

We claim:

1. A switching device comprising a piezoelectric ceramic resonator having two pairs of electrodes which are placed on opposite large surfaces of said resonator and which are positioned symmetrically with respect to the transverse axis of said resonator, and two pairs of terminals attached to the respective electrodes, the terminals of one pair of said two pairs of terminals being grounded, an input terminal which is adapted to be supplied with a subcarrier signal to give said piezoelectric ceramic resonator a piezoelectric vibration, the terminals of the other pair of said two pairs of terminals being output terminals, at one of which appears a first electrical signal induced from said vibration and at the other of which appears a second electrical signal which is opposite in phase to said first signal, said piezoelectric ceramic resonator being in the shape of a thin rectangular plate and in a resonance vibration at a frequency of the subcarrier signal; the two electrodes on one large surface of said resonator extending parallel to the longitudinal axis of said resonator from both ends of said resonator to the middle and being spaced a distance from 2 times to 10 times the thickness of said resonator, a resistor circuit having a midpoint terminal which is adapted to be supplied with a composite signal including a mixture of two distinct suppressed-carrier modulating signals, and two end terminals at each of which appears a balanced signal of said composite signal, respectively and which are coupled to the respective resonator output terminal and a detector including two input terminals, one of which is coupled to one resonator output terminal for receiving a partially demodulated first signal which is a mixture of said balanced signal and said first signal and the other of which is coupled to the other resonator terminal for receiving a partially demodulated second signal which is a mixture of said balanced signal and said second signal, and two output terminals, at one of which appears a single distinct signal detected from said partially demodulated first signal and at the other of which appears a single distinct signal detected from said partially demodulated second signal.

2. A switching device as claimed in claim 1, wherein said piezoelectric ceramic resonator has two pairs of electrode which are placed on opposite large surfaces thereof and which are positioned symmetrically with respect to the longitudinal axis of said resonator, and two pairs of terminals attached to the respective electrodes, the terminals of one pair of said two pairs of terminals being the grounded terminal and said input terminal to be supplied with said subcarrier signal, respectively, and the terminals of the other pair of said two pairs of terminals being said first output terminal and said second output terminal, respectively; the two electrodes on each of said large surfaces extending side by side and parallel to said longitudinal axis, and being spaced a distance so as to satisfy the following relation:

$$Cs < C0(Fa^2 - Fr^2)/Fr^2$$

$$Cs = K/D$$

wherein *Cs* is the coupling capacitance between said input terminal and one of said two output terminals, *Co* is the shunting capacitance between said input terminal and the grounded terminal, *Fr* is a resonant frequency, *Fa* is an antiresonant frequency, *K* is a numerical factor, and *d* is the distance from said input electrodes to one of said two output electrodes.

3. A switching device as claimed in claim 2 in which said piezoelectric resonator is fundamentally resonant in the length extensional vibration made at the frequency of said subcarrier signal.

4. A switching device as claimed in claim 2 wherein said piezoelectric ceramic resonator is fundamentally resonant in the flexural vibration mode at the frequency of said subcarrier signal.

5. A switching device as claimed in claim 1 wherein said piezoelectric ceramic resonator has three pairs of electrodes which are placed on opposite large surfaces thereof and which are positioned symmetrically with respect to the longitudinal axis of said resonator, and three pairs of terminals attached to the respective electrodes, the terminals of the center pair of said three pairs of terminals being coupled together and grounded, the terminals of one pair of the remaining two pairs of terminals being said grounded terminal and said input terminal, respectively, and the terminals of the last pair of said three pairs of terminals being said two output terminals for said first and second signals, respectively, three electrodes on one of said large surfaces being parallel to said longitudinal axis.

6. A switching device as claimed in claim 1, wherein said resistor circuit consists essentially of two resistors connected in series, the junction point of said series connected resistors being said midpoint terminal which is supplied with said composite signal, the ends of said series connected resistors being said two end terminals, each of said two resistors having a value approximately equal to $1/(4\pi FrCO-1/R_L$ where $Fr$ is the resonance frequency of said resonator, $co$ is the shunting capacitance between said input and grounded terminals of said resonator, and $R_L$ is the input impedance of said detector under a load.